UNITED STATES PATENT OFFICE.

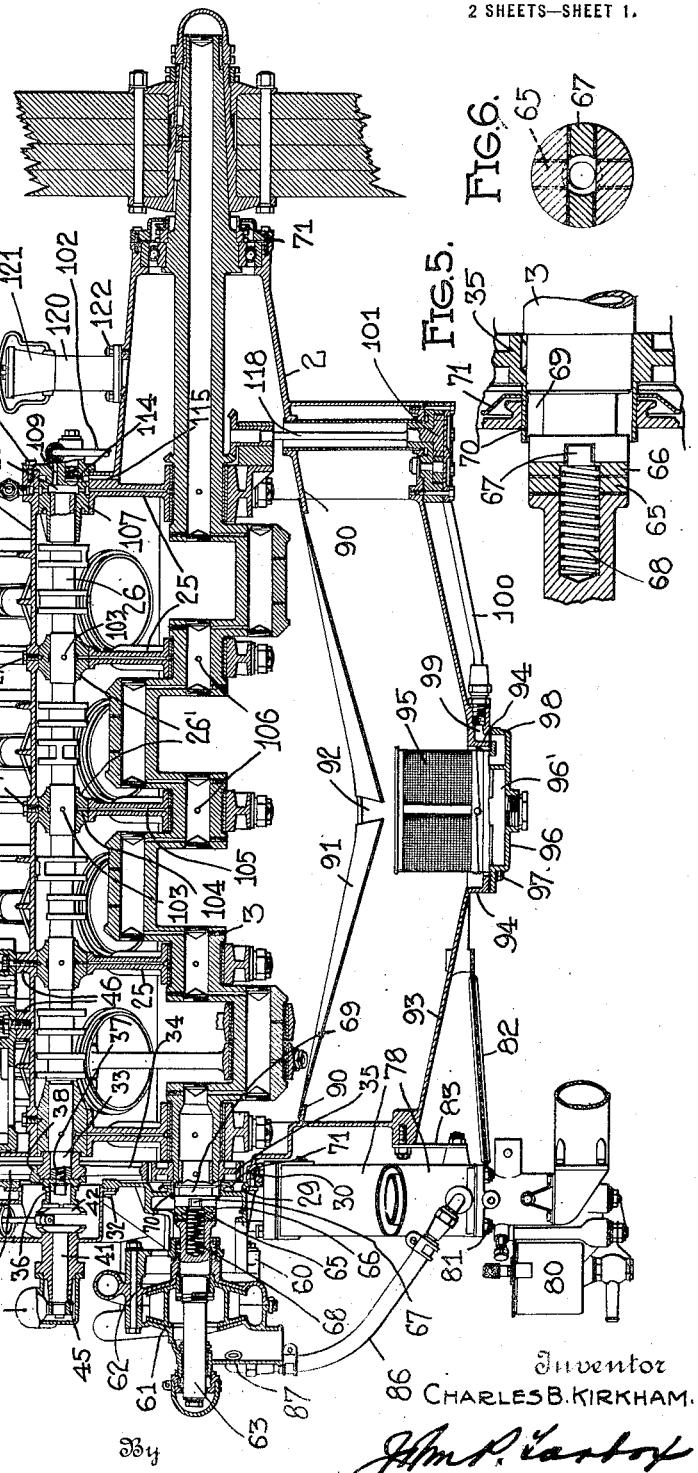

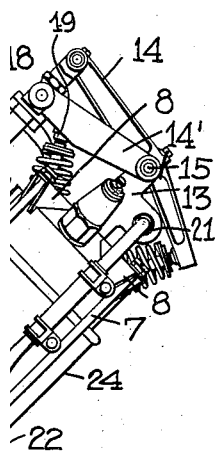
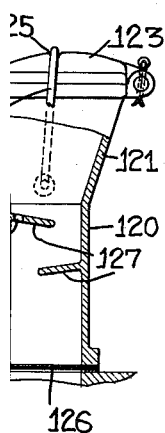
Fig.9.
Inventor
B. KIRKHAM.
Attorney
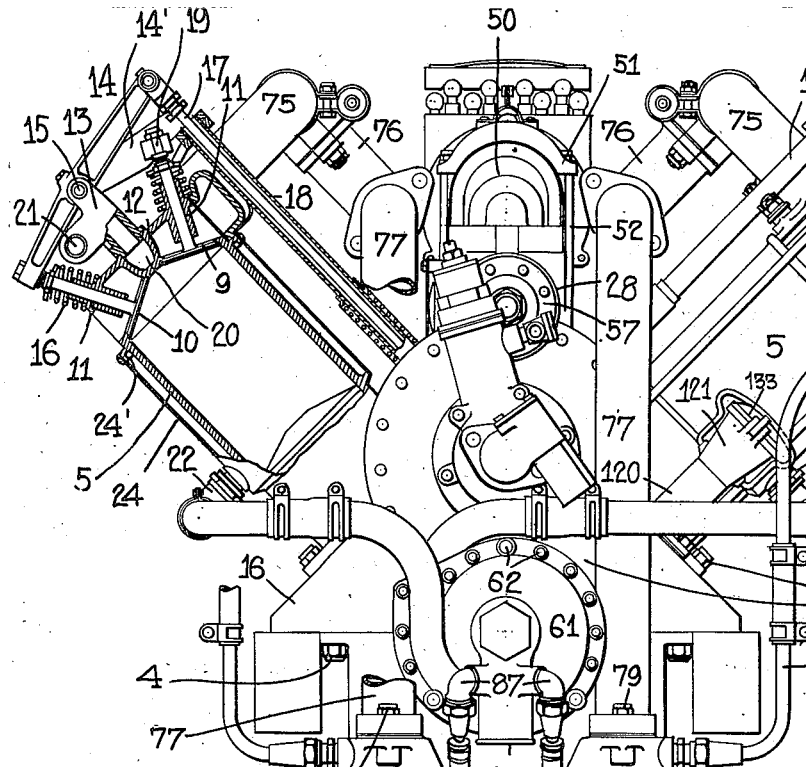
Fig.8.
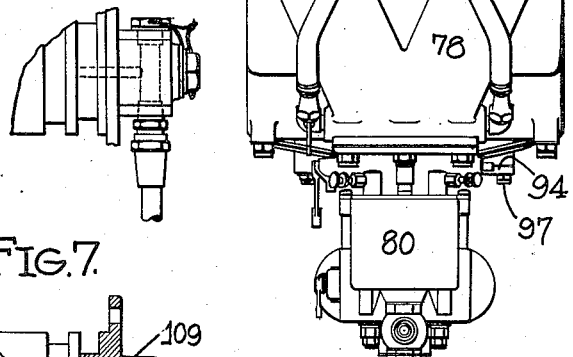
Fig.7.
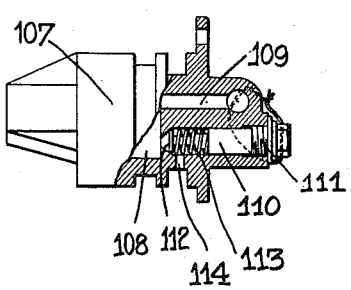
CHARLES
By

CHARLES B. KIRKHAM, OF BUFFALO, NEW YORK, ASSIGNOR TO CURTISS AEROPLANE AND MOTOR CORPORATION, A CORPORATION OF NEW YORK.

INTERNAL-COMBUSTION ENGINE.

1,280,760.　　　　　　　　Specification of Letters Patent.　　　　Patented Oct. 8, 1918.

Application filed January 9, 1918. Serial No. 211,074.

*To all whom it may concern:*

Be it known that I, CHARLES B. KIRKHAM, a citizen of the United States, residing at Buffalo, in the county of Erie and State of New York, have invented certain new and useful Improvements in Internal-Combustion Engines, of which the following is a specification.

This invention relates to internal combustion engines, and the object of it is a motor embodying certain novel features which render it especially adapted to driving aircraft, although certain features thereof are applicable to internal combustion engines generally.

These novel features comprise, among other things, certain improvements in the structure and correlation of the motor and motor accessories, whereby the different parts thereof are easily and readily assembled into a compact, rigid, and durable operative mechanism, the manufacture of the component parts and the assembly thereof being accomplished with a minimum expenditure of time and labor in all operations involved. The improvements also include certain novel features in the lubrication of the moving parts of the motor by forced lubrication, which result in advantages of construction and arrangement of the different lubricating elements, whereby the lubricating system as a whole is greatly simplified and a more effective lubrication of all the moving motor parts is obtained than has hitherto been possible. More specifically, my improved motor is of the multi-cylinder V type, having two banks of cylinders disposed at an angle to each other and certain of the improvements relate particularly to this type of motor, although other novel features of the invention are applicable generally to internal combustion motors of other types.

For a better understanding of the above noted advantages and novel features of my invention and of others which will hereinafter appear, reference may be had to the drawings accompanying this application, Figure 1 of which is a longitudinal sectional view through the center line of the motor; Fig. 2 is an end view thereof with certain parts in section; Fig. 3 is an enlarged detail of the air pump accessory driving mechanism; Fig. 4 is a view taken at right angles to Fig. 3 on the line 4—4; Fig. 5 is an enlarged detail view of the fluid circulating pump driving mechanism; Fig. 6 is a sectional view on line 6—6 of Fig. 5; Fig. 7 is a part sectional and part elevational enlarged detailed view of the end bearing of the cam shaft; Fig. 8 is a plan view thereof; and Fig. 9 is an enlarged view of the intake valve for the crank case.

Referring to the drawings where like numerals refer to like parts throughout, the main body or supporting part of the motor comprises the upper half 1 of the crank case, the lower half being designated by the numeral 2. As usual, the crank case is split in a horizontal plane passing through the crank shaft 3, and the lower half 2 of the case is secured in the usual manner to the upper half 1 by means of bolts 4. The upper half 1, as is usual in the V type motor, is in the form of an inverted V and the cylinders 5 are securely anchored by means of bolts 6 in openings formed in the sides of the crank case, these bolts passing through flanges formed integrally with the lower ends of the cylinders 5. The cylinders are further secured and reinforced in position by elongated bolts 7, which pass from the crank case upwardly along the outside of the cylinders and engage brackets or bridges 8 resting on the top cylinder, these brackets as illustrated comprising 4 arms radiating out from a central body, whereby each cylinder is reinforced by four bolts passing through the respective arms. Each cylinder 5 is formed from a single casting, having two valve chambers in the head thereof and two openings for the intake and exhaust valves 9 and 10 respectively. The guides 11 for the valve stems are preferably cast integrally with the cylinders 5 and between the valve guides 11 is disposed an integral bridge 12, which carries the rocker arms 14 and 14′ and standards 13, the rocker arms 14 and 14′ being pivoted for rocking movement on a shaft 15, passing through and carried by these standards. The valves 9 and 10 are normally maintained in a closed position by coil springs 16 which surround the valve stems, rest upon the valve guides and engage at their upper ends the valve stems as is usual. The rocker arm 14 is pivoted to the tappet rod 17, which passes downwardly and carries a cam follower (not shown) at its lower end for engagement with the cams on the cam shaft. The tappet rod for the intake valves is in the form of a sleeve 18 surrounding the tappet rod 17, the upper end of this sleeve being connected by means of a fork to the tappet 19. It is noted, however, that this valve mechanism forms no part of the present invention. The standards 13 are formed hollow and serve as communicating passages between the water jackets 20 of the valve cages and the water manifold 21, carried by the standards 13. The water manifold 21 has an outlet 22' which leads to a radiating apparatus (not illustrated), this manifold in the usual manner forming the outlet for the water or the cooling fluid in passing from the cylinder jackets. The cylinder jackets 24 are of thin metal construction and are brazed on to the flanges 24' formed integrally with the cylinders 5. These flanges 24' are provided with vertical passages (not shown in the drawings) for establishing communication between the cylinder water jackets and the valve cage jackets. The inlet for the water jackets is indicated at 22 in Fig. 2.

The crank shaft 3 is journaled in bearing supports 25, formed integral with the upper half of the crank case, these supports preferably being in the form of webs passing transversely across the upper half of the crank case. The supports 25 also carry the bearings for the cam shaft 26, which is mounted parallel to the crank shaft and is positioned at the top of the crank case 1. The cam shaft bearings 26' are removable from the supports 25 and are anchored in position by means of set screws 27, passing through bosses formed in the apex at the V of the crank case and engaging the respective bearings.

The left hand end of the crank case Fig. 1 is open and has an upwardly extending flange or housing member 28, which is formed integrally therewith. The open end of the crank case has fitted thereon a closing plate 29 which is securely bolted to the end of the crank case and to the housing 28, as by bolts 30. This plate 29 has an opening therein in alinement with the cam shaft 25 and an air pump accessory 31 is adapted to be secured within this opening, as by means of bolts 32. The cam shaft is provided with an overhanging reduced end 33, upon which is adapted to be keyed a driving gear 34, and this driving gear 34 meshes with a pinion 35 keyed to the end of the crank shaft 3, the cam shaft thereby being driven in the usual manner at half speed for the actuation of the valves in the proper sequence and at the proper time. Also secured to the end of this cam shaft 3 is a clutch member 36, this member 36 being secured thereto in any convenient manner, as by means of a bolt 37, which enters the reduced end 33. This clutch member 36 has a finger 38 disposed between two of the spokes 39 of the gear 34, whereby the clutch member is positively driven therewith. The plunger 40 of the air pump 31 is connected up to a stub shaft 41 by means of connecting rod and crank connections as illustrated and in alinement with this stub-shaft and with the cam shaft, this connection carries a radially grooved clutch member 42, which coöperates with the clutch member 36 to drive the pump directly from the crank shaft 26. A coupler 43 is disposed between these clutch members 36 and 42 for coupling the air pump to the cam shaft when the pump structure 31 is inserted in its position on the end plate 29 of the crank case, this coupler 43 having on one end clutching teeth which engage the groove in member 42 and on its other end having a radial groove at right angles thereto for receiving the teeth on member 36. By forming the clutch or coupler 43 with coöperating members at right angles to each other, the coupler 43 is positively retained in its clutching position when the parts are assembled together. The pump structure 31 carries on its outer end a housing 44, in which are disposed gearing devices for driving a tachometer or other instrument from the end of the stub-shaft 41. The stub-shaft 41 carries a pinion 45 for this purpose, as indicated.

The crank case has formed on the top thereof near its left hand end (Fig. 1) three bosses 46, which carry in an elevated position thereabove a magneto carrier or supporting frame 47, this frame 47 being securely anchored upon the bosses by means of suitable bolts 48 passing downwardly therethrough and engaging threaded apertures in the bosses. The innermost boss 46 is positioned immediately above one of the removable bearings 26' of the cam shaft, and the set screw 49 serves the double purpose of anchoring the frame 47 in position and also in securing the bearing 26' within the support 25. The magneto is designated by the numeral 50 and is secured to the frame or carrier 47 in any convenient manner, as by means of the saddle 51 bridging the top thereof, which is engaged by elongated bolts 52 passing upwardly from the carrier 47. The magneto shaft is indicated at 53 and has a suitable coupling 54 which carries a pinion 55 meshing with the large gear 34 on the cam shaft, whereby the magneto is driven therefrom. The flange or housing 28 has an opening in alinement with the magneto shaft for receiving the coupling shaft disposed between the pinion 55 and the coupler 54, and this opening is adapted to be closed by plate 56 as indicated. Similarly, the other side of the gear housing or the end plate 29 is formed with an opening in alinement with the magneto shaft, and a closing plate 57 is secured thereon as indicated. It is noted, therefore, that the magneto is mounted with its shaft in parallel relation with the cam shaft and in a rigid manner, the magneto being elevated slightly above the crank case by means of the bosses 46, and having its shaft and pinion 55 cooperate with the gear housing 28 and 29 and the gear disposed therein for a convenient drive from the cam shaft.

The end closing plate 29 for the crank case, has an opening in register with the crank shaft 3 and integrally formed therewith, and extending outwardly from this opening is a supporting bracket 60, which carries a cooling fluid circulating pump 61, the pump being securely anchored thereto by means of elongated bolts 62. The pump is of the centrifugal type and its propeller is mounted on a shaft 63, the inner end of which is enlarged and is provided with clutch element or radial groove formed across the end thereof, and is adapted to receive the clutch teeth 65 of the coupler 66. The corresponding end of the crank shaft 3 is provided with clutch element or groove at right angles to the corresponding elements on the pump shaft (in the assembled position), and the coupler 66 has teeth 67 coöperating with these slots on the ends of the crank and pump shafts for forming a driving connection directly with the crank shaft. The coupler 66 by reason of the right angled arrangement of the clutching elements on the opposite ends thereof is positively retained in clutching position and cannot partake of lateral displacement relatively to the shaft. The shaft 63 on its enlarged end has an axial opening extended therein, and in this opening is disposed a coiled spring 68, the outer end of which enters a cavity in the coupler 66, and this spring tends to maintain the coupler in a fixed position against the crank shaft and prevent chattering. In this connection it is noted that the overhanging end of the crank shaft 3 is provided at a point adjacent to coupling member 66 a groove 69, and that an outwardly extending collar 70 is formed integrally with the hub of gear 35 which extends beyond this groove 69. An oil slinger is disposed adjacent the end plate 29, and is carried by the gear collar 70, as indicated more clearly in Fig. 5. A similar oil slinger 71 is provided on the right hand end of the crank shaft within the bearing housing, and by means of these slingers the creeping of oil through the openings in the end plates is greatly reduced.

Each bank of cylinders is provided with an intake manifold 75, mounted within the V, and each manifold has a rearwardly extending conduit 76, which pass between the cylinders and the magneto 50 to the rear end of the motor and are then continued downwardly in vertical branches 77, which pass on opposite sides of and closely to the water pump 61. The vertical branches 77 are discontinued at a point just below the line of the crank shaft and are there connected with a water jacketed V shaped section 78, this section 78 being secured to the vertical section 77 by means of the usual coupling flanges and bolts 79. This water jacketed section 78 extends downwardly to a point substantially in line with the bottom of the crank case 2, and has coupled to its lower end a carbureting apparatus 80. As illustrated in the drawings, this carbureting apparatus comprises a single carbureter for supplying both banks of cylinders with fuel. The carbureter 80 and water-jacketed section 78 of the conduits are coupled together in any convenient manner, as by bolts 81, and are securely braced from the bottom of the crank case by horizontally disposed struts 82 and also by vertical braces 83 fixed to the rear end of the crank case. The water jackets of this section 78 are in communication with the outlet manifold 21 of the cylinder jackets through the connections 85. These connections 85 entering the upper parts of the jackets of section 78 as indicated in the drawings. The outlets for the jackets are the connections 86, which lead outwardly from the bottom of the jackets and then upwardly to the intake 87 of the pump 61. It is understood, of course, that the intake 87 of the pump leads to a radiator not illustrated in the drawings, the other connections to the radiator leading from the outlet 22' of the manifold 21. According to this construction and arrangement, the water pump is carried by a bracket formed integrally with the end plate and the downwardly extending fuel intake conduits terminate in the water-jacketed section 78, and the carbureting apparatus which forms a very compact and desirable arrangement for aeronautical motors, the various parts thereof being constructed and assembled in such a manner that the overall dimensions of the motor as a whole are reduced to a minimum without impairing the efficiency of operation of any of its parts. It is noted also that the construction of all the parts is a very substantial and rigid one, which renders the motor particularly adapted for use on aircraft where a motor is subjected, as is known, to the roughest kind of service. The compact arrangement of the motor and motor accessories lends itself to a ready installation in the comparatively small space available in the fuselage of an aircraft.

*Lubrication.*

The lower half of the crank case has extending inwardly at the ends thereof the flanges 90, and upon these flanges rests a drip pan 91, the sides of this pan being inclined downwardly as indicated, and having an opening 92 for emptying the oil which has been collected from the moving parts of the motor downwardly into the reservoir formed in the bottom of the crank case. The bottom walls of the crank case, indicated as 93, are inclined downwardly, and at the lowest point, which is substantially at the center of the machine, the crank case is provided with an opening defined by the downwardly extending annular flange 94. A screen 95 is adapted to be inserted upwardly through this opening and positioned within the reservoir for straining the used lubricant before it is used again. This screen is carried by a supporting structure 96, which is adapted to be fitted on and clamped to the flange 94 by means of suitable clamping bolts, one of which is indicated at 97. This support 96 has extending outwardly beyond the flange 94 a portion of boss 98, having an opening therein in register with the chamber 99 formed in an enlargement on the bottom of the crank case. An exit pipe or connection 100 leads from this chamber 99 to a lubricant circulating pump of the gear type 101. This pump draws the lubricant from the interior of the reservoir through the screen 95 out through the chamber 99 and from thence through the connections 100 to the pump inlet, and from thence the lubricant is forced upwardly through a connecting or supply pipe 102, the inlet to and outlet from the pump not being shown for convenience in illustration. The cam shaft 26 is formed hollow to serve as a lubricant distributing conduit and has openings 103 at right angles thereto at each one of the removable bearings 26'. Each one of the bearings is formed with an annular groove on its interior for the reception of the lubricant passing out the openings 103 and from these annular grooves there are provided openings 104 in the lower parts of the bearings, which communicate with the vertical openings 105 provided in the supports 25 and leading downwardly to the crank shaft. The crank shaft is also hollow, as indicated in the drawings, and at the crank shaft bearings has radial holes 106 for receiving the oil passing downwardly through the passages 105 in the supports 25. The right hand end bearing 107 of the cam shaft is adapted to be inserted within an opening provided in the end support 25, the opening corresponding in shape thereto, and this bearing is closed at its outer end and has a chamber 108 in which the end of the cam shaft 26 terminates. This bearing also has a longitudinal inlet passage 109, leading outwardly from the chamber 108 to a point adjacent the outer end of the bearing and communicating with this passage is a transverse passage, leading to intake 102, which leads upwardly from the pump 101. This bearing 107 is also bored on its outer end inwardly to the chamber 108 for the reception of a pressure control valve 110. The main body of this valve is held in position by means of the externally threaded screw plug 111, and the valve is provided with a conical shaped valve 112, which seats in a correspondingly shaped seat in the inner end of the passage (Fig. 7), the spring 113 surrounding the valve stem and being interposed between the valve 112 and a shoulder provided around the main body 110 of the valve. The valve 107 is also provided with the transverse passage 114, leading from the valve passage downwardly to a passage 115 provided in the end bearing support 25 and leading back to the reservoir therethrough. There is also provided a transverse passage on the upper part of the valve, which leads from the chamber 108 to a plug connection 116 to which suitable indicating instruments may be attached for indicating the oil pressure or the flow of oil through the lubricating circuit. The valve 107 as a whole is provided with an integral peripheral flange surrounding the opening through the support 25, and the flange is secured in position by screw bolts 117, which pass through this flange and enter threaded apertures around the opening. The pump 101 is driven by a vertical shaft 118, which, as indicated, is provided with a beveled gear on its upper end for engagement with a similar gear on the crank shaft. When the engine is running, the pump 101 is continuously driven and thereby draws the lubricant from the reservoir through the filtering screen 95 downwardly through the screen structure and outwardly through the passage 99 and connection 100 leading to the pump. From the pump, the oil is forced upwardly through the connecting pipe 102 through the passage 109 in the valve 107 and from there to the chamber 108 which is in communication with the lubricating passage 105 provided in the supports 25, through the hollow cam shaft as heretofore set forth. All the cam shaft bearings and the crank shaft bearings are therefore constantly supplied by forced lubrication with a generous supply of lubricant, while the connecting rods and connecting rod bearings are lubricated through the crank shaft throws. The pressure control valve 110 serves to effectively regulate the pressure of the forced lubrication by shunting a portion of the lubricant through a by-pass 114—115 if the pressure becomes too high or high enough to overcome the tension of the spring 113. This pressure valve is capable of adjustment by screwing in and out the screw plug 111.

The crank case is also provided with a novel breather and intake valve which is shown in detail in Fig. 9. This comprises an upwardly extending oil inlet 120 having at its upper end a slightly flaring mouth 121. The inlet has suitable flanges or ears formed around the periphery of its lower end for the reception of securing bolts 122, whereby the device as a whole may be securely fixed to the opening provided on the upper part of the crank case. There is provided a pivoted lid or cover 123, which is adapted to be fixed in the closed position by means of a spring bail member 124, whose ends are secured in bosses on the side of the inlet and this bail springs over the top of the cover 123 and snaps into a suitable notch or groove 125, provided therein. There is also provided a filtering screen 126 across the inlet, which is fixed and clamped between the lower end of the intake and the crank case. Suitable baffles 127 are also provided which extend inwardly on the walls of the intake at different points along its length, these baffles overlapping each other as indicated, and one of them namely the upper, being provided with an aperture 128. These baffles serve to prevent the flowing therepast of foreign matter of large dimensions and also prevent to a certain extent the splashing of the oil therepast in outward directions during the rough usage to which an aeroplane motor is subjected. The lid 123 may be imperforate if the device is used only as an intake, while if it is used as a breather valve, this lid would be perforated or provided with a filtering screen. The diagrammatic illustration is intended to cover both.

In accordance with the requirements of the patent statutes, I have set forth my invention in the specific manner required thereby, but it is understood that the claims hereto annexed are not to be limited to the specific device illustrated, except as is specifically recited therein, or is rendered necessary by a consideration of the prior art.

What is claimed is:

1. In an internal combustion engine, in combination, a crank case having an open end and having a gear housing extending upwardly from said open end, a crank shaft within and extending longitudinally of the crank case, a cam shaft also extending longitudinally of the crank case and journaled above said crank shaft, said shafts terminating at one end substantially in a vertical plane, coincident with the open end of said crank case, a detachable end closing plate for said crank case and said housing, motor accessories carried by said end plate in alinement with said shafts, said motor accessories being adapted to be driven directly from said shafts, coupling members for said shafts and said accessories, said coupling members being independent of said shafts and accessories but adapted to be maintained in alinement and in engagement therewith when the closing end plate is inserted and anchored in position, and gearing devices disposed between said shafts and inclosed within said housing.

2. In an internal combustion engine, in combination, a crank case having an open end, a crank shaft within said crank case and extending longitudinally thereof, a cam shaft also within said crank case and extending longitudinally thereof, said shafts terminating at one end substantially in a vertical plane coincident with the open end of said crank case, a detachable end closing plate for said crank case, said end plate having a water pump supporting bracket extending transversely thereof and in alinement with said crank shaft, a water circulating pump carried by said bracket, a detachable air pump structure carried by said end plate and in alinement with said cam shaft, and coupling members disposed between said shafts and said pumps, said coupling members being independent of said shafts and pump shafts but adapted to be maintained in alinement and in engagement therewith when the closing end plate is inserted and anchored in position.

3. In an internal combustion engine, in combination, a crank case having an open end and having a gear housing extending upwardly therefrom, a crank shaft within said crank case and extending longitudinally thereof, a cam shaft also within said crank case and extending longitudinally thereof, said cam shaft being disposed above said crank shaft and driven therefrom, said shafts terminating at one end substantially in a vertical plane co-incident with the open end of said crank case, a detachable end closing plate for said crank case and said housing, said end plate having an integral water pump supporting bracket extending transversely thereof and in alinement with said crank shaft, a water circulating pump carried by said bracket, a detachable air pump structure carried by said end plate and in alinement with said cam shaft, coupling members disposed between said shafts and said pumps, said coupling members being independent of said shafts and pumps but adapted to be maintained in alinement and in engagement therewith when the closing end plate is inserted in position, and a system of spur gears disposed between said shafts and extending upwardly into said housing.

4. In an internal combustion engine, in combination, a crank case having an open end, a crank shaft within said crank case and extending longitudinally thereof, said shaft terminating at one end substantially in a vertical plane co-incident with the open end of said crank case, a detachable end closing plate for said crank case, said end plate having a water pump supporting bracket extending transversely thereof and in alinement with said crank shaft, a water circulating pump carried by said bracket, a coupling member disposed between said crank shaft and said water pump, said coupling member being independent of said crank shaft and said pump, but adapted to be maintained in alinement and in engagement therewith when the closing end plate is inserted and anchored in position, and a spring disposed within a chamber in the end of said water pump shaft and engaging said coupling.

5. In an internal combustion engine, in combination, a crank case having an open end, a crank shaft within said crank case and extending longitudinally thereof, a cam shaft also within said crank case and extending longitudinally thereof, said cam shaft being disposed above said crank shaft and driven therefrom, said shafts terminating at one end, substantially in a vertical plane co-incident with the open end of said crank case, a detachable end closing plate for said crank case, said end plate having an integral water pump supporting bracket extending transversely thereof and in alinement with said crank shaft, a water circulating pump carried by said bracket, a detachable air pump structure carried by said end plate and in alinement with said cam shaft, coupling members disposed between said shafts and said pumps, said coupling members being independent of said shafts and pumps, but adapted to be maintained in alinement and in engagement therewith when the closing end plate is inserted and anchored in position, and a spring disposed within a chamber in the end of the water pump shaft and engaging the water pump coupling.

6. In an internal combustion engine, in combination, a crank case having an open end and a flange at the open end projecting upwardly from the top thereof, a crank shaft and a cam shaft driven therefrom, disposed within said crank case, said crank case having downwardly extending integral supports from the top thereof, said supports carrying bearings for said shafts, the bearings for said cam shaft being detachably mounted on said supports and in engagement with the top of said crank case, set screws passing through the top of said case and engaging said detachable bearings, said crank case also having a plurality of bosses on the top thereof adjacent the open end for supporting a magneto carrier in an elevated position above said crank case, means for anchoring said carrier to said bosses including one of said set screws, an end closing plate for said crank case which forms with said flange a chamber for the magneto driving gears, and means for anchoring said magneto to said carrier.

7. In an internal combustion engine, in combination, a crank case having an open end and a flange at the open end projecting upwardly from the top thereof, a crank shaft, a cam shaft located above said crank shaft and disposed within said crank case, said crank case having downwardly extending integral supports from the top thereof, said supports carrying bearings for said shafts, the bearings for said cam shaft being detachably mounted on said supports and in engagement with the top of said crank case, set screws passing through the top of said case and engaging said detachable bearings, said crank case also having a plurality of bosses on the top thereof adjacent the open end for supporting a magneto carrier in an elevated position above said crank case, means for anchoring said carrier to said bosses including one of said set screws, an end closing plate for said crank case which forms with said flange a gear transmission chamber, means for fixing said magneto to said carrier and motor accessories carried by said end plate in alinement with said shafts and coupled thereto.

8. In an aeronautical motor, in combination, a crank case, two banks of cylinders arranged in a V and mounted on said crank case, a crank shaft journaled within said crank case, a closing end plate for said crank case having an integral pump support and carrying a fluid circulating pump in alinement with said crank shaft, said pump being driven directly from said crank shaft, an intake manifold for each bank of cylinders arranged within the V, said manifolds having individual conduits extending rearwardly and then downwardly past the end of the crank shaft, and on opposite sides of said water pump a carbureting apparatus supported substantially in line with the bottom of the crank case and braced therefrom, a water-jacketed V shaped section of manifold conduit coupled directly to said carbureting apparatus at the apex of its V and forming a continuation of said manifold conduits, and branched water circulating connections leading from the jackets of said cylinders through the jackets of said conduit section to the intake of said pump.

9. In an aeronautical motor, in combination, a crank case having an inverted V-shaped top, two banks of cylinders mounted on the sides of said crank case top and forming a V, a crank shaft journaled within said crank case, a closing end plate for said crank case, having an integral pump support and carrying a fluid circulating pump in alinement with said crank shaft, said pump being driven by said crank shaft, an intake manifold for each bank of cylinders arranged within the V, said manifolds having individual conduits extending rearwardly to the end of the motor, carbureting apparatus supported substantially in line with the botsaid manifolds hav-
ts extending rear-
vardly past the end
on opposite sides of
bureting apparatus
in line with the bot-
a water jacketed V
old conduit coupled
ing apparatus at the
ig a continuation of
and branched water
leading from the
through the jackets
o the intake of said motor, in combina-
ing an inverted V-
f cylinders mounted
k case top and form-
urnaled within said
plate for said crank
culating pump, said
said crank shaft, an
h bank of cylinders
said manifolds hav-
ts extending rear-
e motor, carbureting
ibstantially in line
e crank case, water
manifold conduit
l carbureting appa-
ntinuations of said
branched water cir-
leading from the
through the jackets
to the intake of said I hereunto affix my

B. KIRKHAM.

end, a crank shaft within said crank case and
extending longitudinally thereof, said shaft
having a drive and terminating at one end
substantially in a vertical plane coincident
with the open end of said crank case, a de-
tachable end closing plate for said crank
case, said end plate having a water pump
supporting bracket extending transversely
thereof, a water circulating pump and shaft
carried by said bracket, a coupling member
disposed between the crank shaft drive and
said water pump, said coupling member be-
ing independent of said crank shaft drive
and said pump, but adapted to be maintained
in alinement and in engagement therewith
when the closing end plate is inserted and
anchored in position, and a spring disposed
within a chamber in the end of said water
pump shaft and engaging said coupling.

11. In an internal combustion engine, in
combination, a crank case having an open end
and a flange at the open end projecting up-
wardly from the top thereof, a crank shaft, a
cam shaft located above said crank shaft and
disposed within said crank case, said crank
case having downwardly extending integral
supports from the top thereof, said supports
carrying bearings for said shafts, the bear-
ings for said cam shaft being detachably
mounted on said supports and in engagement
with the top of said crank case, set screws
passing through the top of said case and
engaging said detachable bearings, said
crank case also having a plurality of bosses
on the top thereof adjacent the open end for
supporting a magneto carrier in an elevated
position above said crank case, means for
anchoring said carrier to said bosses, an end
closing plate for said crank case which
forms with said flange a gear transmission
chamber, a magneto and means for fixing arranged within the V,
ing individual condui
wardly and then downv
of the crank shaft, and
said water pump, a cai
supported substantially
tom of the crank case,
shaped section of manif
directly to said carburet
apex of its V and formii
said manifold conduits,
circulating connections
jackets of said cylinders
of said conduit section t
pump.

13. In an aeronautical
tion, a crank case hav
shaped top, two banks o
on the sides of said cranl
ing a V, a crank shaft jc
crank case, a closing end
case carrying a fluid cir
pump being driven by s
intake manifold for eac
arranged within the V,
ing individual condui
wardly to the end of the
apparatus supported s
with the bottom of the
jacketed sections of
coupled directly to saic
ratus and forming coi
manifold conduits, and
culating connections
jackets of said cylinders
of said conduit sections
pump.

In testimony whereof
signature.

CHARLES